Figure 31:
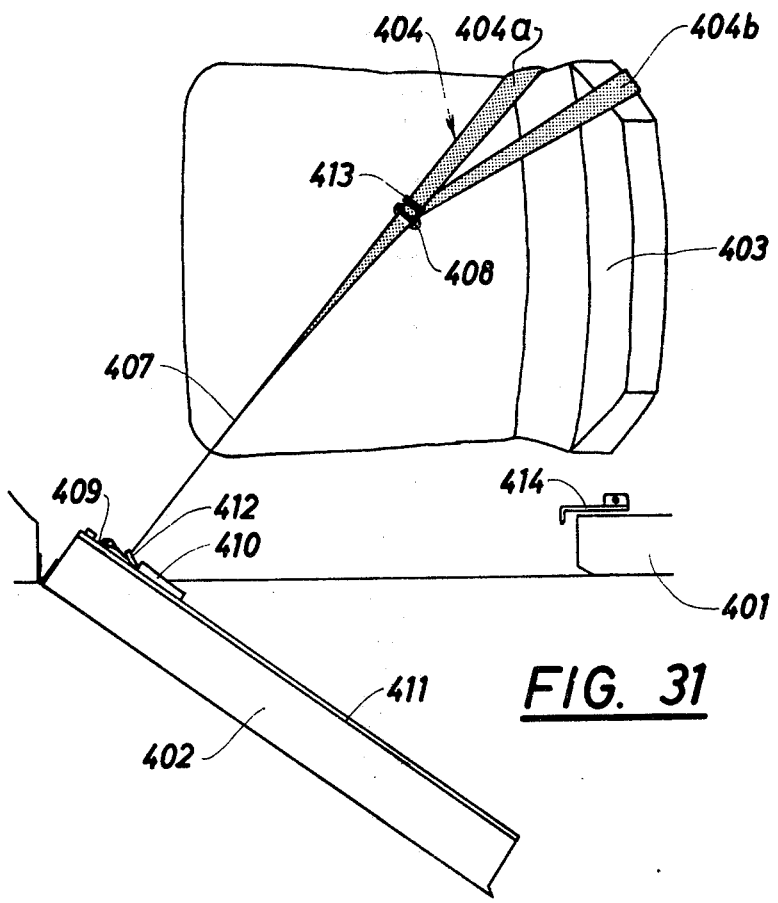

United States Patent [19]

Lindblad

[11] 3,915,472

[45] Oct. 28, 1975

[54] SAFETY BELT ARRANGEMENT FOR INDIVIDUALS

[76] Inventor: Oskar Lennart Lindblad, Hedasgatan 16, 440 20 Vargarda, Sweden

[22] Filed: Apr. 5, 1974

[21] Appl. No.: 458,290

Related U.S. Application Data

[62] Division of Ser. No. 179,134, Sept. 9, 1971, Pat. No. 3,822,760.

[30] Foreign Application Priority Data

| Sept. 9, 1970 | Sweden | 12225/70 |
| Sept. 25, 1970 | Sweden | 13045/70 |
| Nov. 2, 1970 | Sweden | 14714/70 |
| Dec. 30, 1970 | Sweden | 17726/70 |
| Dec. 31, 1970 | Sweden | 17858/70 |
| Feb. 10, 1971 | Sweden | 1694/71 |

[52] U.S. Cl. ........................................ 280/150 SB
[51] Int. Cl.² ...................................... B60R 21/10
[58] Field of Search ............ 280/150 SB; 180/82 C; 297/388, 389

[56] References Cited

UNITED STATES PATENTS

| 2,858,144 | 10/1958 | Oppenheim | 280/150 SB |
| 2,937,882 | 5/1960 | Oppenheim | 280/150 SB |
| 3,583,726 | 4/1969 | Lindblad | 280/150 SB |

Primary Examiner—Robert R. Song
Attorney, Agent, or Firm—Ulle C. Linton

[57] ABSTRACT

Safety belt arrangement for vehicles which includes belts positioned for extending across the body of a person sitting on a seat in the vehicle with one end of the strap secured to the vehicle on a side of the seat opposite a side wall of the vehicle and the other end of the strap slideably connected on the inside of a door of the vehicle and means for automatically displacing the belt along said door upon operation of the ignition circuit from in front of the seat to across the person.

4 Claims, 9 Drawing Figures

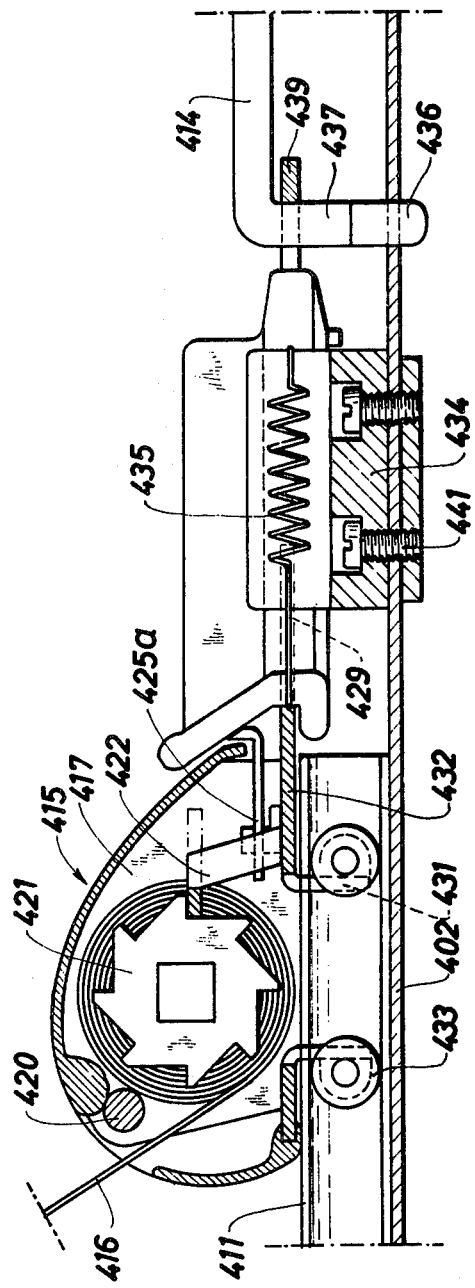
F/G. 39

SAFETY BELT ARRANGEMENT FOR INDIVIDUALS

The present application is a divisional application from my co-pending application Ser. No. 179,134 filed Sept. 9, 1971 which has resulted in Pat. No. 3,822,760 dated July 9, 1974.

The present invention relates to safety belts for vehicles.

One object of the invention is to provide a safety blet which is very simple to put on so that persons using the vehicle will be induced to use the belt during each journey.

Another object of the invention is to provide a safety belt arrangement wherein the belt straps or straps in the position of non use are disposed in such a manner in front of the driver or passenger seat that it will not hinder entrance to the seat but will have to be tightened around the body in order not to cause an obstruction during the journey.

A further object of the invention is to provide a safety belt arrangement in which the straps or straps will automatically close around the driver or passenger after closing the door to the driver or passenger seat respectively, and upon closing an electric circuit.

Still further objects of the invention will be apparent from the following detailed disclosure.

A safety belt arrangement according to the invention comprises at least one belt strap extending across the body of a person sitting on the seat provided with the safety belt arrangement, one end of said strap being secured to the seat of the chassis of the vehicle to that side of the seat which is opposite to the nearest side wall of the vehicle and the opposite end of said strap being connected to attachment means slideable in a guide from a front position in which the safety belt is inactive to a rear position in which the safety belt is tightened around a person sitting in the seat and vice versa.

According to other features of the invention said guide for the slideable attachment means may be provided on the inside of a door of the vehicle with means being provided for automatically displacing said attachment means toward its rear position upon turning of the ignition key.

Figure 32:
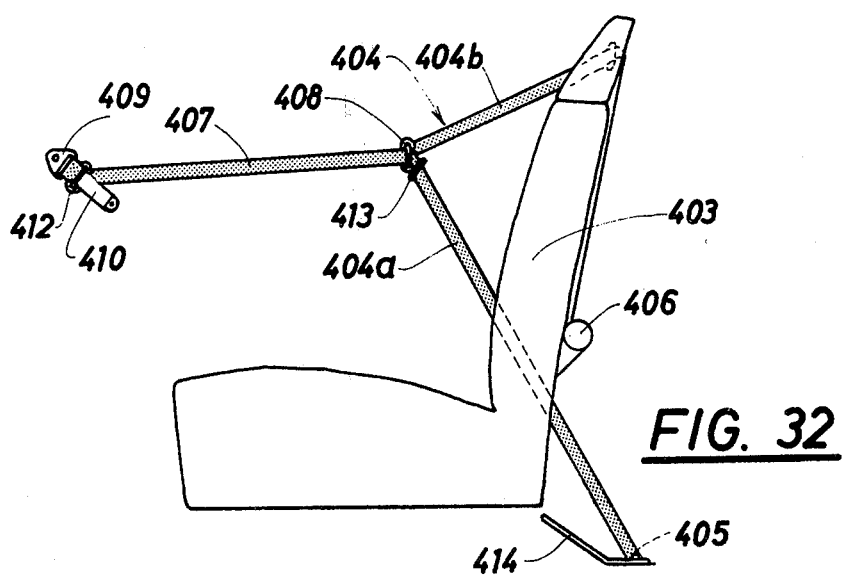
Figure 33:
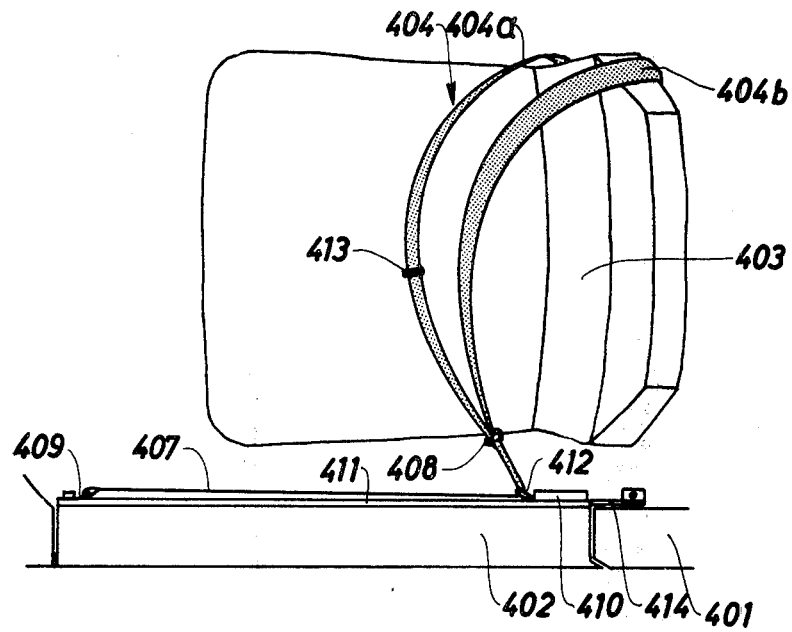
Figure 34:
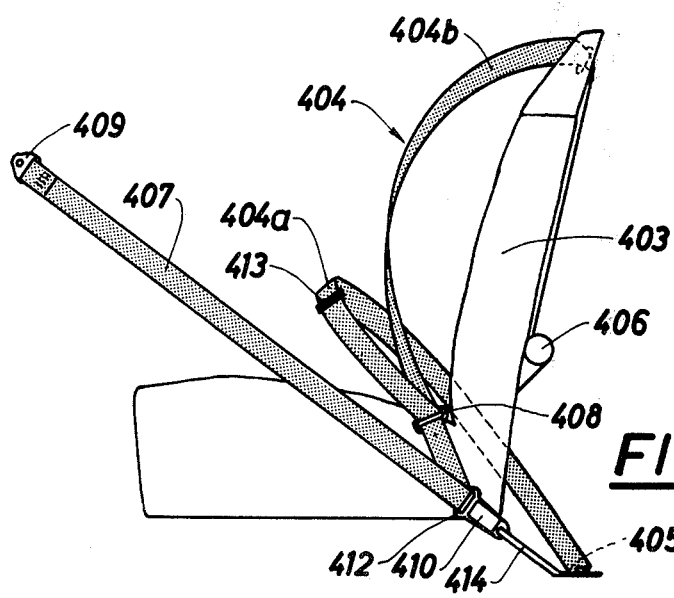
Figure 36:
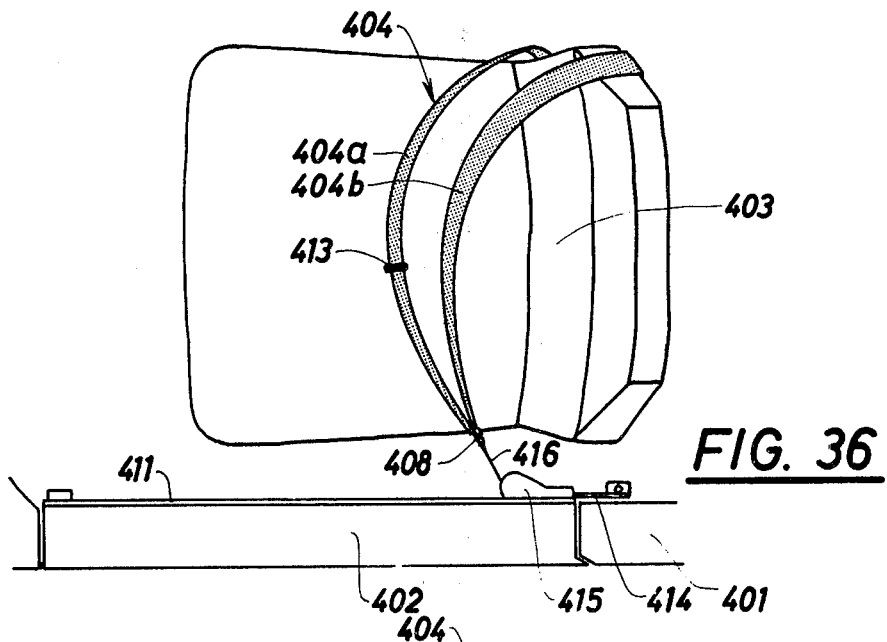
Figure 35:
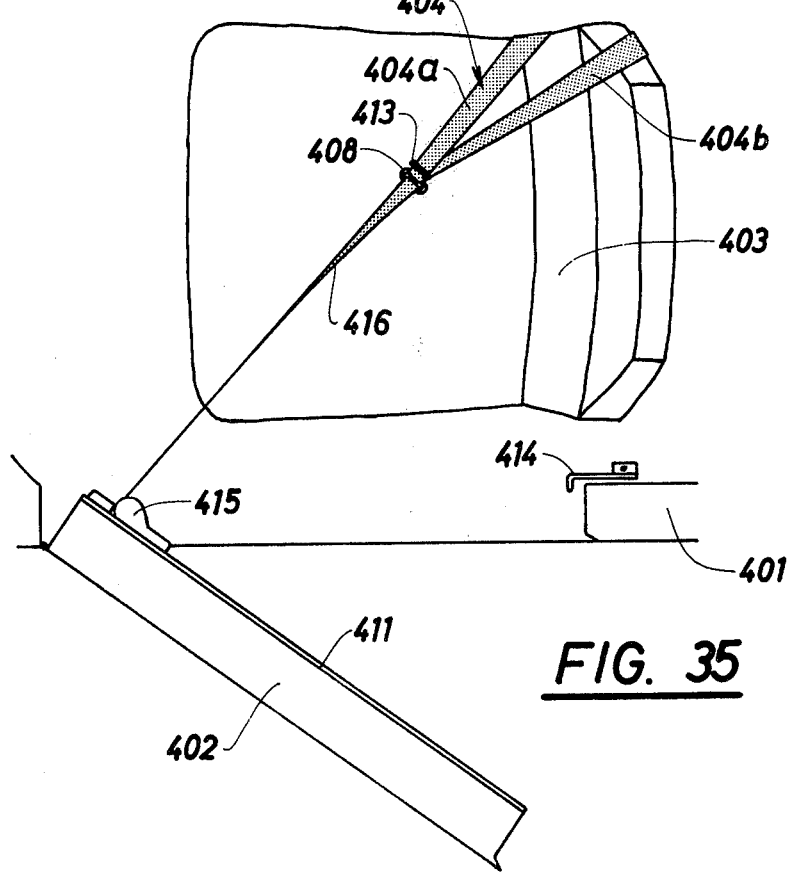
Figure 37:
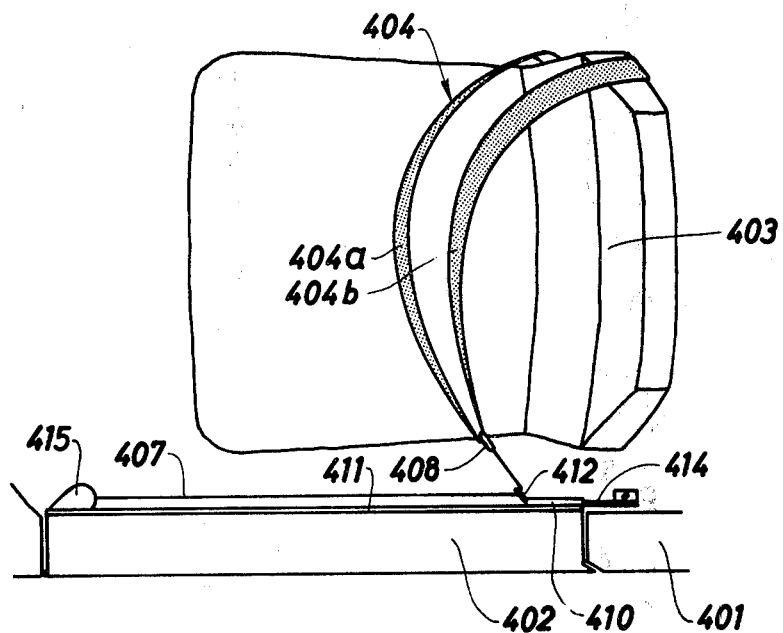
Figure 38:
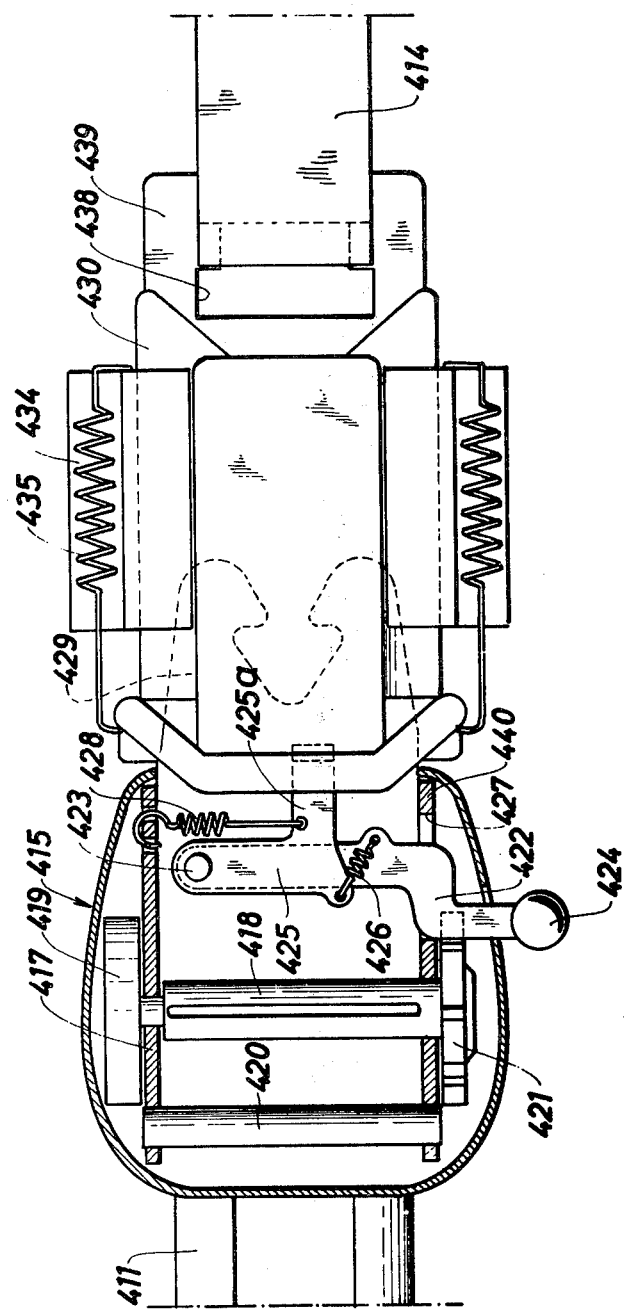

The invention will be more particularly described herebelow with reference to the accompanying drawings wherein:

FIG. 31 is a view from above of a driver's seat in a vehicle provided with a safety belt arrangement according to the invention, the door of the vehicle being open and the safety belt being in its inoperate position, FIG. 32 is a side view of the arrangement shown in FIG. 31 with the side wall and the door of the vehicle removed for clarity, FIG. 33 is a view corresponding to FIG. 31 with the door closed and the belt in its active position, FIG. 34 is a side view corresponding to FIG. 32 with the safety belt in the same position as in FIG. 33, FIG. 35 is a view corresponding to FIG. 31 showing a safety belt of a different embodiment in its operate position, FIG. 36 is a view corresponding to FIG. 33 illustrating the safety belt shown in FIG. 35 in its active position, FIG. 37 is a view corresponding to FIGS. 33 and 36 showing a safety belt of a further embodiment, FIG. 38 is a view partly in section of a detail comprised in the safety belt illustrated in FIGS. 35 and 36, and FIG. 39 is a side view of a detail according to FIG. 38 with some portions in section.

In FIGS. 31–34 the side wall of the vehicle is indicated at 401, the door is indicated at 402 and the numeral 403 indicates a seat. Numeral 404 indicates a belt forming part of the safety belt and which is placed so that it forms substantially a V with the angle pointing towards the side of the vehicle. The belt portion 404a of the belt 404 is secured at its free end to the vehicle floor 405 and the belt portion 404b has its end portion connected to a winding-up roller 406, preferably of the type which prevents winding off of the belt when the vehicle is subjected to rapid accelerations. Numeral 407 indicates a further belt which has one end secured to an eyelet 408 through which the belt 404 is slideably passed and which is secured at its other end to an attachment 409 at the front end of the door. Numeral 410 indicates a slide which is movable along a guide 411 and which is preferably electrically driven and which is further provided with an eyelet 412 through which belt 407 is passed. Numeral 413 indicates an abutment which is preferably adjustable and which limits the movement of the eyelet 408 in the longitudinal direction of the belt 404. When the slide 410 is in the front position shown FIGS. 31 and 32 the belts 404 and 407 are in such a position that they will not hinder the entrance into the automobile or exit therefrom. By suitable adjustment of the position of the abutment member 413 the level of the belt 407 above the seat may be adjusted so that the belt 407 does not prevent entrance or exit when the safety belt is in the inoperative position illustrated in FIGS. 31 and 32. When the door is closed and the slide 410 is displaced rearwardly that portion of the belt 407 which extends between the eyelet 408 and slide 410 will be shortened which results in that the belt will be tightened across the body of the person in the seat. Numeral 414 indicates a locking member provided in the chassis of the vehicle for interconnection with the slide 410 and the rear end position thereof thereby locking the vehicle door and at the same time maintaining the safety belt in its active position.

In FIGS. 35 and 36 the seat is indicated at 403, the door at 402, the wall of the vehicle is indicated at 401, the guide is indicated at 411, and the locking member with which the slide is interconnectable is indicated at 414. This embodiment differs from the previous embodiment in that the winding-up roller is mounted together with the slide to form a unit 415. This means that the belt 416 extending between the belt 404 and the door 402 has its outer end portion adapted to be wound up on the winding-up roller provided in the unit 415.

The embodiment shown in FIG. 37 differs from the embodiment of FIGS. 31–34 in that the winding up roller 415 is secured at the front portion of the door 402 whereas the remainder of the safety belt arrangement corresponds to the embodiment of FIGS. 31–34.

FIGS. 38 and 39 illustrate an arrangement which may be used in connection with the embodiment shown in FIGS. 35 and 36. As in FIG. 36 the unit formed by the slide and the winding up roller is indicated at 415, the guide is indicated at 411, the door with 402 and the coupling or locking member secured to the chassis is indicated at 414. Numerals 417 and 440 indicate two end walls of a support wherein there is rotatably journalled a winding up roller 418 which is provided at one end with a spring 419 which tends to turn the roller 418 in the direction in which the belt 416 is wound up onto the roller. Numeral 420 indicates a roller which extends between the end walls 417 and 440. At its upper end the roller 418 carries a tooth wheel 421. Numeral 422 indicates a lever which is pivotally journalled on a shaft 423 and which extends through one of the walls 440 via a slot 427 and which is provided at its free end with a handgrip 424 for manually swinging the lever. Numeral 425 indicates another lever which is likewise pivoted on the shaft 423 and which is maintained by a draw spring 426 in the position indicated in FIG. 38 relative to the operating arm 422. A draw spring 428 extends between a portion 425a of the arm 425 extending at right angles to the operating arm 422 and the other end wall 417, said draw spring extending to swing both arms 422 and 425 counter clockwise according to FIG. 38 and thereby to move the operating arm 422 which serves as a locking pawl in a direction away from the ratchet wheel 421. Numeral 429 indicates a coupling member which is movable together with the slide and which is interconnectable with a coupling member 430 provided at the rear side of the door. On downwardly bent portion 431 of the bottom portion 432 of the support there are rotatable journalled a number of wheels or rollers 433 which run in the guide 411 which is made in the form of a rail with a C-shaped cross section. The coupling member 430 is secured to the door by means of a holder 434 which is secured in the sheet metal structure of the door 402 by means of screws 441. The coupling member 430 is displaceable in its longitudinal direction relative to the holder 434 a short distance against the action of two draw springs 435. The member 414 is provided with an outwardly bent end portion the outer portion 436 which is wider than the portion 437. The coupling member 430 is provided at the side facing away from the unit 415 with a plate shaped projecting portion 439 which is provided with a T-shaped opening 438 the left portion of which according to the drawing is wider than the left portion 436 of the member 414 and the right portion of which according the drawing is narrower than the end portion 436 of the member 414 but slightly larger than the portion 437. This means that the coupling member 430 will be kept in its position to the right when it is not interconnected with the unit 415 which means that the end portion 436 of the member 414 may freely be moved into and out of the opening 438 which is the case upon opening and closing of the door to the vehicle. When the unit 415 and the coupling member 430 have been interconnected and the pulling force in the belt 416 which occurs due to the spring force acting upon the winding-up roller will cause the coupling member 430 to be moved to the left against the action of the springs 435. This takes place under the condition that the springs 435 and 419 have been dimensioned correctly. This means that the door will be locked when the unit 415 and the coupling member 430 are interconnected. Upon interconnection of the unit 415 and the coupling member 430 the portion 425a of the lever 425 will abut against the coupling member 430 and thereby force the levers 425 and 422 to swing in clockwise direction against the action of the spring 428 that is to the position wherein the operating arm 422 is in engagement with the ratchet wheel 421 whereby winding off of belt 416 is prevented. However, the pawl may be released from the ratchet wheel by manually swinging the arm 422 in counter clockwise direction against the action of the spring 426. The releasing of the unit 415 from the coupling member 430 may preferably be effected by the intermediary of a wire or rod or the like provided in the door and forming a connection between the inside hand for opening the door and the coupling member 430.

I claim:

1. A safety belt arrangement for vehicles comprising a vehicle having at least one pivoted door and a seat alongside said door, a one-piece V-shaped safety belt connected to said vehicle with one portion positioned forming a lap belt across said seat and a further portion positioned forming a shoulder belt across said seat, an eyelet having said safety belt slideably extending therethrough, a further belt having one end connected to said eyelet, and means being mounted on said door capable of moving said further belt to and from said seat upon the pivoting of said door and shortening said further belt upon the pivoting of said door to its vehicle closing position.

2. A safety belt arrangement as claimed in claim 1 wherein said means comprises a guide on said door extending longitudinally of the vehicle, a slide on said guide, an eyelet on said slide having said further belt slideably extending therethrough and said further belt having its other end connected to said door.

3. A safety belt arrangement as claims in claim 1 wherein said means comprises a guide on said door extending longitudinally of the vehicle, a slide on said guide and a belt take-up device on said slide having the other end of said further belt connected thereto.

4. A safety belt arrangement as claimed in claim 2 including a belt take-up device connected to said door and said further belt other end.

* * * * *